United States Patent Office 3,063,189
Patented Nov. 13, 1962

3,063,189
FISHING LINE
Edwin Hastings Keller, Wawa, Pa., assignor to E. I. du Pont de Nemours and Company, Wilmington, Del., a corporation of Delaware
No Drawing. Filed Jan. 2, 1962, Ser. No. 163,884
8 Claims. (Cl. 43—44.98)

This invention relates to a new and useful fishing line. In the past, fishing lines have been of two general types. The first type is the woven, twisted or braided type which is opaque and either white or dyed a darker color. The second type is the monofilament lines. These monofilament lines are generally made from transparent material.

White lines have the advantage that they are easier for the fisherman to see and therefore are easier to prevent from tangling when several lines are used from one boat as in trolling and in party boats. However, such fishing lines are more readily seen by the fish than the transparent lines and therefore, are not considered to be as effective at catching fish as the opaque lines.

It is an object of this invention to provide a fishing line which is visible above water yet is relatively invisible below the surface of the water, thereby providing a fishing line which is visible to the fisherman but not visible to the fish. It is a further object to produce such a fishing line in one piece so as to avoid the problem of attaching leaders to a visible line.

These objects are accomplished by incorporating an ultraviolet light activated fluorescent dye in the fishing line. The dye glows in the presence of daylight, both in direct sunlight and on overcast or cloudy days. However, water, and especially ocean water, absorbs ultraviolet light, and the line does not glow when submerged in water because the activating source of ultraviolet light has been removed.

This invention is applicable to all types of fishing lines, however, the preferred fishing lines are monofilament fishing lines formed from synthetic plastics and particularly polyamide monofilament fishing lines. Stretched polycaprolactam monofilament fishing lines are especially preferred. This preference is because of the physical characteristics of such fishing lines, such as combined strength and flexibility.

The preferred dyes are ultraviolet fluorescent dyes. These dyes glow when they are in the presence of ultraviolet light. The preferred fluorescent dyes may be grouped into seven categories, which are the coumarins, the azoles, the benzidine sulfone derivatives, acylated derivatives of diaminostilbene-disulfonic acid, triazine derivatives of diaminostilbenedisulfonic acid, naphthalene triazole derivatives, and miscellaneous. Examples of these types are as follows:

Coumarins, having the structures such as

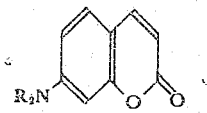

where R is selected from the group consisting of methyl and ethyl radicals, and

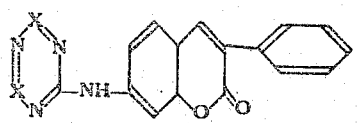

wherein X is selected from the group consisting of chlorine, hydroxyl, aliphatic amine, and substituted anilines. The latter dyes are further disclosed in U.S. Patent 2,945,033.

Azoles, having the basic structure

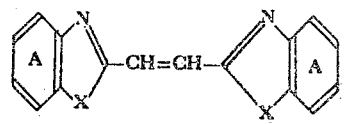

where X is oxygen, sulfur, nitrogen or a R substituted nitrogen where R is hydroxyalkyl or di-alkylaminoalkyl as disclosed in U.S. 2,483,392, U.S. 2,488,094, U.S. 2,488,248 and U.S. 2,620,282.

Benzidine sulfone derivatives having the structure

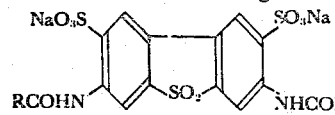

wherein R is a substituted alkyl or substituted aryl group as indicated in U.S. 2,563,795.

Ureido and acylated derivatives of diaminostilbenedisulfonic acid having the structures

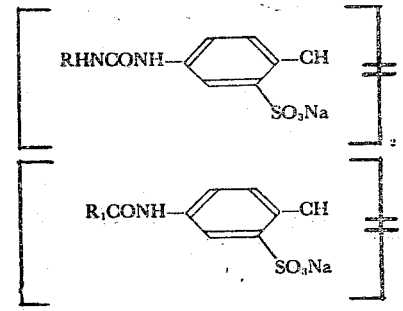

where R is an aryl or a substituted aryl group and $R_1$ is a substituted aryl or a substituted alkyl group examples of which are shown in U.S. Patent 2,521,665, U.S. Patent 2,468,431 and in German Patent 746,569.

Triazine derivatives of diaminostilbenedisulfonic acid having the structures

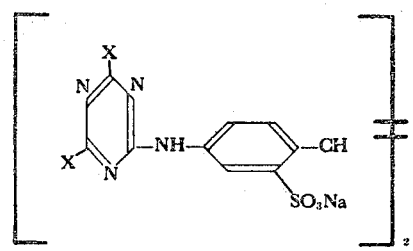

where X is chlorine, amine, aryl or alkyl substituted amino groups as shown for example in U.S. Patent 2,473, 475.

Naphthalene triazole derivatives having the structure

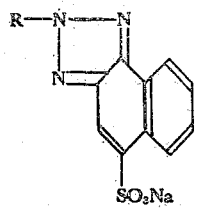

where R is stilbene or substituted stilbene derivatives as disclosed in British Patent 717,889, U.S. Patent 2,784,188, or a dehydrothis-p-toluidine derivative as disclosed in U.S. Patent 2,713,055.

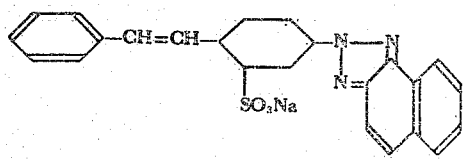

and

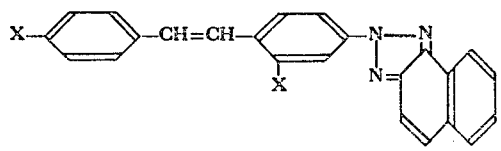

wherein X is selected from the group consisting of SO₃C₆H₅, chlorine and CN; as disclosed in U.S. Patent 2,784,184, and miscellaneous fluorescent dyes such as pyrazolines having the structure

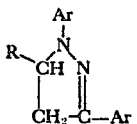

wherein Ar is an aryl radical, and R is selected from the group consisting of hydrogen, alkyl radicals and aryl radicals;

Aminonaphthalimides having the structure

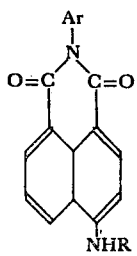

wherein Ar is an aryl radical, and R is selected from the group consisting of hydrogen, alkyl radicals and aryl radicals, a fluorescent dyestuff of the structure

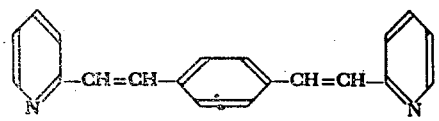

as disclosed in U.S. Patent 2,980,623; a fluorescent dyestuff having the structure

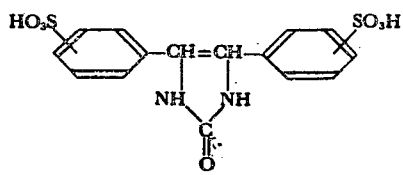

and a fluorescent dyestuff having the structure

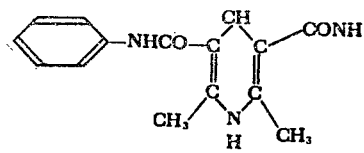

These fluorescent dyes are further described in an article by Dr. A. W. Adams which appeared in the Journal of the Society of Dyers and Colourists, vol. 75, pages 22–31 (1959).

Each of the above dyestuffs lose their fluorescent behavior on the order of $10^{-8}$ seconds after removal of the ultraviolet light source as by immersion in an ultraviolet absorbing system such as water.

Dyes may be either incorporated in the melt during the manufacture of the fishing line or applied to the line from a dyebath.

The following examples are illustrative of the invention. The artificial light referred to in these examples contained substantially no ultraviolet light.

*Example I*

One kilogram of one eighth inch cubes of polyhexamethylene adipamide having a number average molecular weight of about 16,000 was placed in an open top container. One half gram of a fluorescent dyestuff having the structure

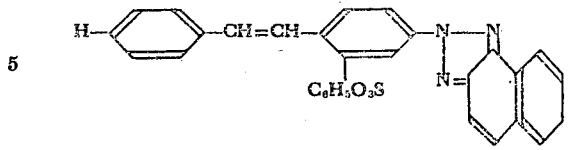

was poured over the cubes and mixed by tumbling on a roll mill for 24 hours. The mixture then dried in an oven at 80° C. for 24 hours using a nitrogen sweep. The mixture was then charged into an extruder, melted by heating to 280° C., and forced through a 0.040 inch diameter extrusion die. The extruded filament was then passed through a water quench maintained at 20° C. and was then passed through a water bath maintained at 70° C. and stretched 4½ times its original length by means of pinch rolls. The filament was then passed through an oil bath maintained at 160° C., and slightly stretched to 5.3 times its original length by means of pinch rolls. The oil was then washed from the filament with soap and water at about room temperature, rinsed in water and the filament was ready for use as a fishing line. This line had a purple color in direct sunlight and was the normal color under artificial light.

*Example II*

One kilogram of one eighth inch cubes of polycaprolactam having a number average molecular weight of about 20,000 was placed in an open top container. One gram of a fluorescent dyestuff having the structure

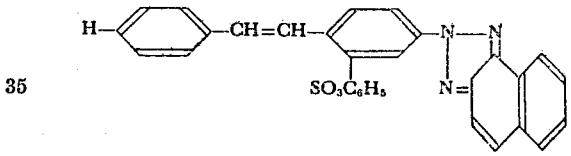

was poured over the cubes and mixed by tumbling on a roll mill for 24 hours. The mixture then dried in an oven at 80° C. for 24 hours using a nitrogen sweep. The mixture was then charged into an extruder, melted by heating to 260° C., and forced through a 0.040 inch diameter extrusion die. The extruded filament was then passed through a water quench maintained at 20° C., and was then passed through a water bath maintained at 80° C. and stretched 4½ times its original length by means of pinch rolls. The filament was then passed through a polyethylene oxide bath maintained at 160° C. and slightly stretched to 5.6 times its original length. The polyethylene oxide was then washed off with water and the completed fishing line placed on a spool. This line had a purple color in direct sunlight and was the normal color under artificial light.

*Example III*

One kilogram of one eighth inch cubes of polyomega-aminoundecanoic acid having a number average molecular weight of about 13,000 was placed in an open top container. Two grams of a fluorescent dyestuff having the structure

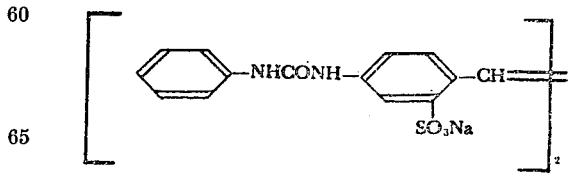

were poured over the cubes and mixed by tumbling on a roll mill for 24 hours. The mixture was then charged into an extruder, melted by heating to 240° C. and forced through a 0.040 inch diameter extrusion die. The extruded filament was then passed through a water quench at 20° C. and was then passed through a water bath at 65° C. and stretched 3 times its original length by means of pinch rolls. The filament was then passed through a polyethylene oxide bath maintained at 100° C. and slightly stretched to 4½ times its original length by means of pinch rolls. The polyethylene oxide was washed off in a water bath and the completed filament placed on a spool. This line had a purple color in direct sunlight and was the normal color under artificial light.

*Example IV*

One thousand grams of one eighth inch cubes of a copolymer of 90% by weight hexamethylene adipamide and 10% by weight ω-caprolactam having a number average molecular weight of about 16,000, plasticized with 3% by weight 2-pyrrolidone were placed in an open top container. Two and one half grams of a fluorescent dyestuff having the structure

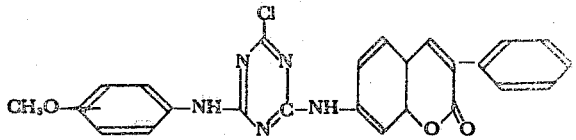

were poured over the cubes and mixed by tumbling on a roll mill for 24 hours. The mixture was then dried in an oven at 80° C. for 24 hours using a nitrogen sweep. The mixture was then charged into an extruder, melted by heating to 270° C. and forced through a 0.040 inch die. The extruded filament was then passed through a water bath maintained at 65° C. and stretched 4 times its original length by means of pinch rolls. The filament was then passed through a polyethylene oxide quench maintained at 165° C. and stretched to 5 times its original length by means of pinch rolls. The filament was then washed in water and placed on spools. This line had a purple color in direct sunlight and was the normal color under artificial light.

*Example V*

One thousand grams of polyethylene terephthalate flake having a number average molecular weight of about 20,000, were placed in an open container. One gram of a fluorescent dyestuff having the structure

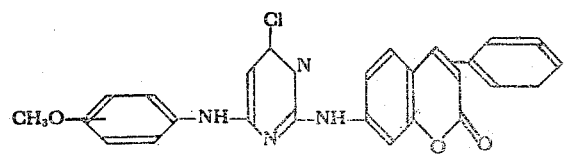

was poured over the powder and mixed by tumbling on a roll mill. The mixture then dried in a vacuum oven at 140° C. for 16 hours with 26 inch vacuum. The mixture was then charged into an extruder, melted by heating to 280° C. and forced through a 0.040 inch die. The extruded filament was then passed through a water quench maintained at 18° C. and was then passed through a water bath maintained at 98° C. and stretched to 4.8 times its original length by means of pinch rolls. The filament was then spooled. This line had a purple color in direct sunlight and was the normal color under artificial light.

*Example VI*

Example III was repeated except one kilogram of 80 wt. percent hexamethylene adipamide and 20% ε-caprolactam copolymer having a number average molecular weight of about 17,000 and plasticized with 8 wt. percent based on the copolymer with N-ethyl (o+p) toluene sulfonamide, was substituted for the plasticized hexamethylene adipamide ω-caprolactam copolymer of Example IV. This line had a purple color in direct sunlight and was the normal color under artificial light.

The above polyamide and polyester compositions containing melt incorporated fluorescent activated dyestuffs have been used to form conventional braided fishing lines with results comparable to those obtained with the monofilament lines. That is, the lines retained their normal strength and appeared the normal color in artificial light containing no ultraviolet but glowed purple in sunlight.

*Example VII*

A one hundred yard skein of 6 lb. test, 80% by weight hexamethylene adipamide, 20% by weight ω-caprolactam copolymers, 5.3 × stretched, monofilament, fishing line was dipped into a dyebath containing .1% by weight (based on the weight of the monofilament) of a fluorescent dye having the structure

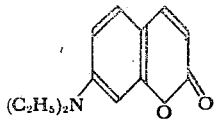

The dyebath had been acidified to pH 5 by addition of acetic acid. The dyebath was maintained at 97° C. and the period of residence of the fishing line in the bath was 30 minutes. This line had a purple color in direct sunlight and was the normal color under artificial light.

*Example VIII*

A one hundred yard skein of polyethylene terephthalate 5 ply, braided, 8 lb. test, fishing line, the filaments of which had been stretched 4.5 times their original length prior twisting into plys for braiding, was treated in a dyebath having 40:1 by wt. dyebath to fiber ratio containing 0.1 wt. percent of a fluorescent dyestuff having the structure

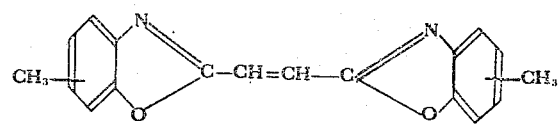

The dyebath was maintained at 97° C., and was acidified to pH 5 by means of acetic acid. The period of residence of the fishing line in the dyebath was 30 minutes. This line had a purple color in direct sunlight and was the normal color under artificial light.

*Example IX*

A one hundred yard skein of untreated hard twisted cotton fishing line having a break test strength of 12 lbs. was treated in a dyebath having a 40:1 by wt. dyebath to fiber ratio containing 0.035 wt. percent of the filament calculated as a 100% active ingredient product of a fluorescent dyestuff having the structure

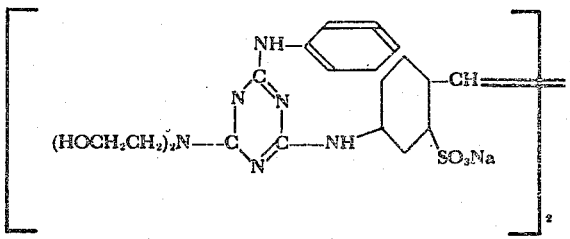

The dyebath had been adjusted to a pH of 7±0.5. The period of residence of the fishing line in the dyebath was 30 minutes, and the dyebath was maintained at 80° C. This line had a purple color in direct sunlight and was the normal color under artificial light.

*Example X*

A one hundred yard skein of 15 lb. test, hard, braided, linen fishing line was dyed in a dyebath having a 40:1 by weight dyebath to fiber ratio containing 0.1 wt. percent (as a 100% active ingredient product) of a dyestuff having the structure

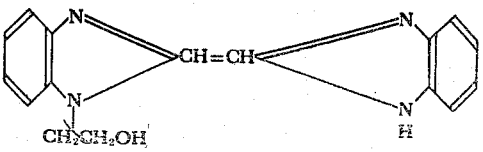

The dyebath had been adjusted to neutral pH. The dyebath was maintained at 80° C., and the period of residence of the fishing line in the dyebath was 30 minutes. This line had a purple color in direct sunlight and was the normal color under artificial light.

The lines of this invention preferably contain from 0.05 to 0.5 wt. percent of fluorescent dyestuff based on the weight of the line.

The lines of this invention have been found to be especially advantageous when party boat fishing, trolling multiple lines from a boat or surf fishing. The lines of this invention are especially useful on, boat rods, rolling outriggers, spinning rods, and bait casting rods, having the appropriate conventional reel fitted in each of the above cases.

For strength reasons the lines are made of synthetic materials such as the polyamides and polyesters above described are preferably stretched at least to an amount such that they break upon being stretched another one hundred percent. Even greater stretching than this, to further orient the fibers, is desirable in order to prevent undue stretching during use. Suitable strengths range from 1 to 300 lbs. test breaking strength with from 2 to 60 lbs. test breaking strengths, being the preferred range.

I claim:

1. A fishing line, formed of a synthetic plastic material, which is oriented at least to a point such that a stretching of 100% would cause the line to break, which line contains a fluorescent dyestuff, which glows on being exposed to ultraviolet light, and which rapidly ceases to glow upon removal of ultraviolet light.

2. An oriented polyamide, monofilament fishing line containing a fluorescent dyestuff which glows when exposed to ultraviolet light, which line has been stretched from 4½ to 6 times its original length.

3. The fishing line of claim 1 in which the synthetic plastic material is in the form of a braided polyester.

4. The fishing line of claim 2 in which the fluorescent dyestuff has been applied to the surface by dyeing.

5. The fishing line of claim 2 in which the fluorescent dyestuff is present in from 0.05 to 0.5 wt. percent of the fishing line and is intimately mixed throughout the thickness of the said fishing line.

6. The fishing line of claim 5 in which the polyamide contains polymerized caprolactam.

7. The fishing line of claim 6 in which the fluorescent dyestuff is a naphthalene triazole derivative.

8. The fishing line of claim 1 in which the dyestuff is distributed throughout the plastic.

References Cited in the file of this patent

UNITED STATES PATENTS

| | | |
|---|---|---|
| 1,501,953 | Leslie | July 22, 1924 |
| 1,791,199 | Gardner | Feb. 3, 1931 |
| 2,108,598 | Burr | Feb. 15, 1938 |
| 2,214,442 | Spanagel | Sept. 10, 1940 |
| 2,285,552 | Alfthan | June 9, 1942 |
| 2,417,383 | Switzer | Mar. 11, 1947 |
| 2,457,808 | Dort | Jan. 4, 1949 |

FOREIGN PATENTS

| | | |
|---|---|---|
| 827,440 | Germany | Jan. 10, 1952 |

UNITED STATES PATENT OFFICE
CERTIFICATE OF CORRECTION

Patent No. 3,063,189 November 13, 1962

Edwin Hastings Keller

It is hereby certified that error appears in the above numbered patent requiring correction and that the said Letters Patent should read as corrected below.

Column 7, line 16, strike out "are".

Signed and sealed this 30th day of April 1963.

(SEAL)
Attest:

ERNEST W. SWIDER
Attesting Officer

DAVID L. LADD
Commissioner of Patents